H. W. HORTON.
WEEDER.
APPLICATION FILED OCT. 21, 1911.
1,033,698.
Patented July 23, 1912.
2 SHEETS—SHEET 1.
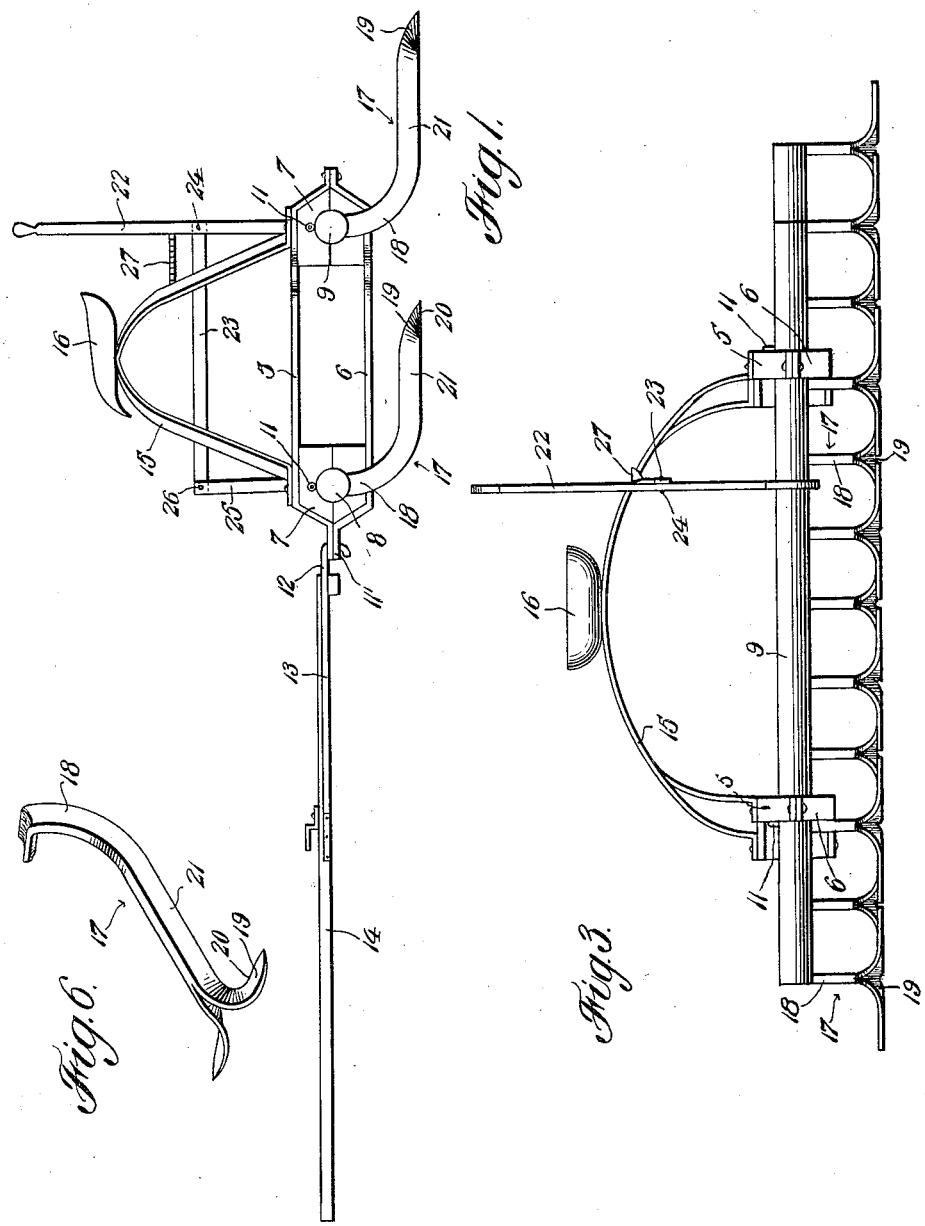

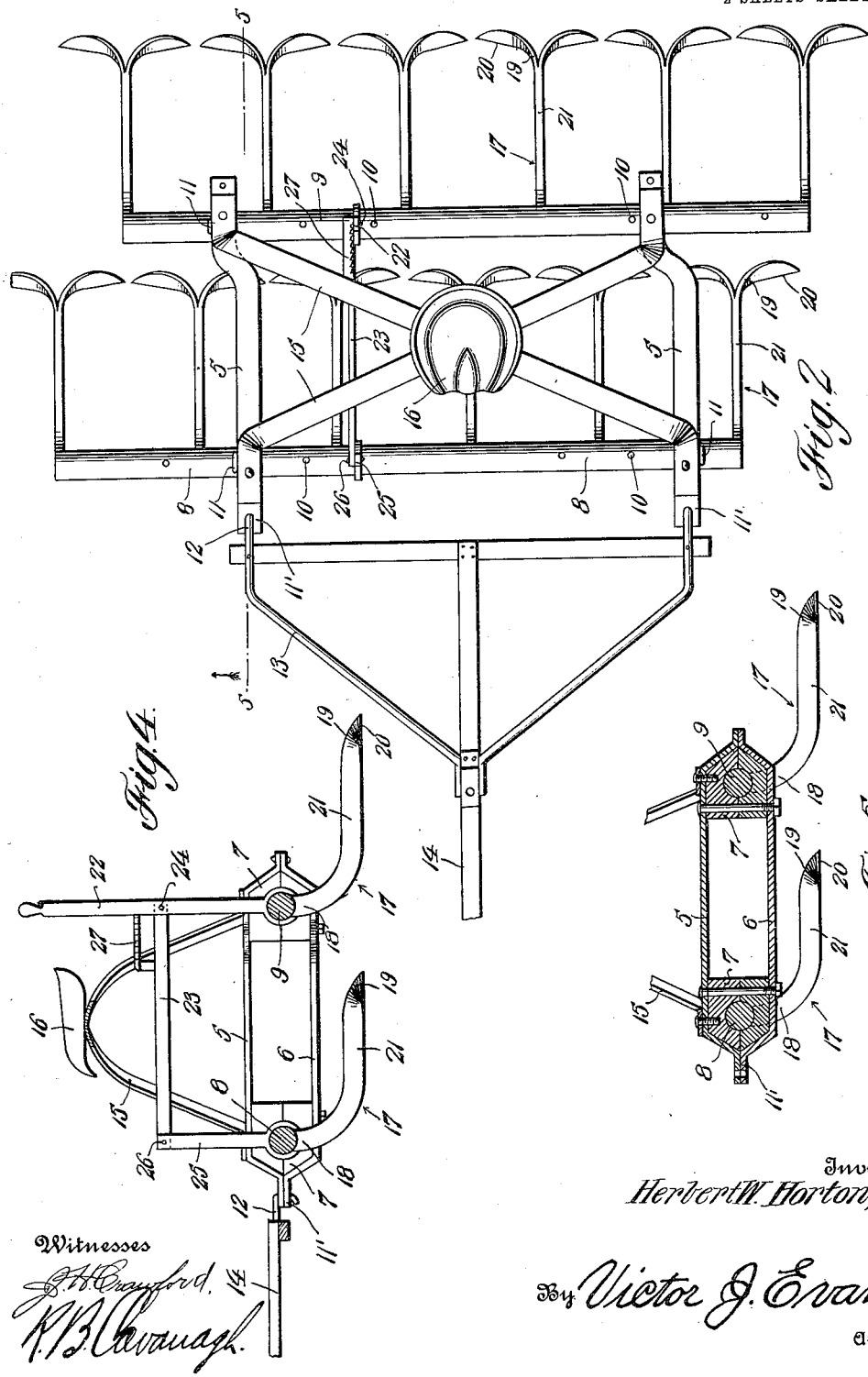

UNITED STATES PATENT OFFICE.

HERBERT W. HORTON, OF CLARKSTON, WASHINGTON.

WEEDER.

1,033,698.  Specification of Letters Patent.  Patented July 23, 1912.

Application filed October 21, 1911.  Serial No. 655,956.

*To all whom it may concern:*

Be it known that I, HERBERT W. HORTON, a citizen of the United States, residing at Clarkston, in the county of Asotin and State of Washington, have invented new and useful Improvements in Weeders, of which the following is a specification.

The invention relates to farming implements, and more particularly to the class of weeders.

The primary object of the invention is the provision of a weeder in which standing weeds may be severed from the ground, during the advancement of the machine, and also that will render the ground in good condition for growing crops.

Another object of the invention is the provision of a weeder in which the cutting elements for severing the weeds from the ground may be adjusted, whereby rows of corn or other standing crops may be weeded out, when the machine is drawn through a field, the ground being rendered perfectly smooth and in healthy condition for the cultivation of the growing crop.

A further object of the invention is the provision of a weeder of this character which is simple in construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a weeder constructed in accordance with the invention. Fig. 2 is a top plan view thereof. Fig. 3 is a rear elevation. Fig. 4 is a vertical longitudinal sectional view through the weeder. Fig. 5 is a sectional view on the line 5—5 of Fig. 2; Fig. 6 is a perspective view of one of the ground working elements.

Similar reference characters indicate corresponding parts throughout the several views of the drawings.

Referring to the drawings by numerals, the weeder comprises spaced upper and lower side bars 5 and 6, respectively, the ends of the upper and lower side bars being brought together and united in any suitable manner. Fixed between the side bars 5 and 6, at the front and rear ends thereof, are bearing blocks 7, in which are journaled the front and rear turning shafts 8 and 9, respectively, the same being of any desirable length, and provided with a plurality of transverse openings 10 for receiving cotter pins 11 which prevent the lateral displacement of the shafts in the bearings.

The front ends of the upper and lower side bars 5 and 6 are provided with forwardly directed perforated eyes 11', in which are engaged the hook terminals 12 of rearwardly diverging brace irons 13 carried by a draft pole 14, to which are hitched the draft animals for advancing the weeder through a field. However, in lieu of the draft pole, any other suitable draft rigging may be connected with the weeder, if found desirable. Fixed to and rising from the upper side bars 5 are seat standards 15 supporting the usual rider's seat 16 to be occupied by the operator of the weeder.

Fixed to and depending from the turning shafts 8 and 9 are substantially Y-shaped combination ground working and weed cutting members 17, the same being arranged in rows, and the members of one row are disposed in staggered relation to the members of the other row. Each member 17 is formed with an upwardly curved forward end 18, and a split rear end providing rearwardly diverging forwardly inclined cutting blades 19, the forward edges of which are sharpened to provide knife edges 20, the medial portion of the member being designed to serve as a runner 21, and adapted to cut into the earth or ground, so as to prevent lateral shifting of the weeder during the travel of the same over the ground, the blades 19 penetrating the ground below the surface thereof, so as to sever weeds or other foreign plants near or at the roots thereof. It will be noted that the members 17 will render the ground perfectly smooth, during the advancement of the weeder, and also that all standing weeds will be severed therefrom.

Fixed to the shaft 9 is a throw lever 22, the same being pivoted to a shift bar 23 by means of a pivot 24, the shift bar being connected to an arm 25 by means of a pivot 26, the said arm being fixed to the shaft 8. Thus, it will be seen that on operating the throw lever 22, the shafts 8 and 9 will be simultaneously turned for the raising or lowering of the members 17, relative to the ground. Fixed to the shift bar 23 in the path of movement of the throw lever 22 is a toothed sector 27, with which engages the said throw lever 22, so that the latter may be locked in adjusted position for sustaining the members 17 either in raised or lowered position relative to the ground.

It will be evident that should it be desired to shift the shafts 8 and 9 in the bearings 7, it is only necessary to remove the cotter pins 11, and by properly adjusting the same in the openings 10, the members 17 may be brought into alinement with each other, so that the device may be used for thinning out standing rows of corn or other crops.

From the foregoing, taken in connection with the accompanying drawings, it is thought that the construction and operation of the invention will be readily understood, without requiring a more extended explanation.

What is claimed is:

A farming implement, comprising a frame having bearings at the front and rear thereof, turning shafts journaled in said bearings, means carried by the shafts to prevent lateral displacement thereof, eye extensions formed on the forward end of the frame, draft rigging connected with said eye extensions, means for simultaneously turning the shafts, and a plurality of spaced rearwardly extending runners fixed to said shafts in staggered relation to each other, the rear ends of the runners being split to form rearwardly diverging forwardly inclined cutting blades.

In testimony whereof I affix my signature in presence of two witnesses.

HERBERT W. HORTON.

Witnesses:
  VILLARD A. BILDERBACK,
  PERRY H. GIPSON.

---

Copies of this patent may be obtained for five cents each, by addressing the "Commissioner of Patents, Washington, D. C."